United States Patent
Gleason

(10) Patent No.: US 8,814,485 B2
(45) Date of Patent: Aug. 26, 2014

(54) HOLLOW WALL MOUNTING ASSEMBLY

(76) Inventor: Scott T. Gleason, Yukon, OK (US)

( * ) Notice: Subject to any disclaimer, the term of this patent is extended or adjusted under 35 U.S.C. 154(b) by 48 days.

(21) Appl. No.: 13/426,771

(22) Filed: Mar. 22, 2012

(65) Prior Publication Data

US 2013/0195578 A1 Aug. 1, 2013

Related U.S. Application Data

(60) Provisional application No. 61/590,977, filed on Jan. 26, 2012.

(51) Int. Cl.
*F16B 21/00* (2006.01)

(52) U.S. Cl.
USPC .......................................... 411/344; 411/999

(58) Field of Classification Search
USPC .................. 411/367, 344, 999, 340
See application file for complete search history.

(56) References Cited

U.S. PATENT DOCUMENTS

| | | | | |
|---|---|---|---|---|
| 1,521,026 A * | 12/1924 | Hubener | ...................... | 411/344 |
| 1,993,391 A * | 3/1935 | Weaver, Jr. | .................... | 439/779 |
| 2,301,135 A * | 11/1942 | Molat | ........................... | 411/345 |
| 3,288,014 A * | 11/1966 | Mortensen | ..................... | 411/344 |
| 3,473,431 A * | 10/1969 | King, Jr. | ....................... | 411/344 |
| 4,183,386 A * | 1/1980 | Brown | .......................... | 411/176 |
| 4,971,502 A * | 11/1990 | Oh | ................................. | 411/340 |
| 5,007,223 A * | 4/1991 | Holland | .................... | 52/745.21 |
| 5,044,854 A * | 9/1991 | Oh | ................................ | 411/344 |
| 5,061,134 A * | 10/1991 | Oh | ................................ | 411/385 |
| 5,110,243 A * | 5/1992 | Oh | ................................ | 411/344 |
| 5,472,304 A * | 12/1995 | Gold | ............................ | 411/344 |
| 7,726,926 B2 * | 6/2010 | Lemire | ......................... | 411/340 |

* cited by examiner

*Primary Examiner* — Gary Estremsky
(74) *Attorney, Agent, or Firm* — Dunlap Codding, P.C.

(57) ABSTRACT

A wall mounting assembly includes a threaded bolt having a longitudinally extending bore, an anchor bar, a cord, and a bushing configured to plug the hole in the wall. The bolt and anchor bar, attached by the cord, can be introduced through a hole in the wall and, by retrieving the cord, the threaded bolt can be caused to insert through a bolt hole in the anchor bar, and through the bushing aperture plugging the hole in the wall, thereby drawing the anchor bar flush against an interior surface of the wall. A fixture back plate positioned between an exterior surface of the wall and an end of the bolt, can be secured against the exterior surface of the wall by tightening a nut onto the threaded bolt, thereby also securing the anchor bar flush against the interior surface of the wall.

5 Claims, 4 Drawing Sheets

HOLLOW WALL MOUNTING ASSEMBLY

CROSS REFERENCE TO RELATED APPLICATIONS

The present application claims the benefit under 35 U.S.C. 119(e) of U.S. Provisional Application Ser. No. 61/590,977, filed Jan. 26, 2012, the entirety of which is hereby expressly incorporated herein by reference.

BACKGROUND OF THE INVENTIVE CONCEPTS

1. Field of the Inventive Concepts

The inventive concepts disclosed and claimed herein relate to a wall mounting assembly, and more particularly, but not by way of limitation, to an anchored wall mounting assembly for mounting and anchoring articles to a hollow or thin wall while allowing heavy loading.

2. Brief Description of Related Art

A number of different fasteners are available for securing or suspending articles from thin or hollow surfaces such as doors, drywall and ceilings, with greater mounting strength than can be achieved using conventional screws and nails. For example, threaded drywall anchors, threaded drywall toggles, winged anchors, molly bolts, toggle bolts, and the like are used for hollow wall constructions such as drywall, composition sheet, plasterboard, and molded fiberglass walls. A limitation of the presently utilized fasteners is their relatively low maximum weight loading. For example, grab bars that are mounted next to bath tubs or toilets should sustain a load of about 200 to 300 pounds. The presently marketed hardware for mounting on hollow wall constructions will not provide this load-bearing capability. There is a need for a wall mounting assembly that can provide a high load-bearing capability and which is economical and easy to install. It is to such a wall mounting assembly that the presently disclosed and claimed inventive concept(s) is directed.

SUMMARY OF THE INVENTIVE CONCEPTS

The inventive concepts disclosed and claimed herein generally relate to a wall mounting assembly and methods for using the wall mounting assembly. In one embodiment, a wall mounting assembly includes a threaded bolt having a longitudinally extending bore, an anchor bar, a cord, and a bushing configured to plug the hole in the wall. The bolt and anchor bar, attached by the cord, can be introduced through a hole in the wall and, by retrieving the cord, the threaded bolt can be caused to insert through a bolt hole in the anchor bar, and through the bushing aperture plugging the hole in the wall, thereby drawing the anchor bar flush against an interior surface of the wall. A fixture back plate positioned between an exterior surface of the wall and an end of the bolt, can be secured against the exterior surface of the wall by tightening a nut onto the threaded bolt, thereby also securing the anchor bar flush against the interior surface of the wall.

BRIEF DESCRIPTION OF THE DRAWINGS

Like reference numerals in the figures represent and refer to the same or similar element or function. Implementations of the disclosure may be better understood when consideration is given to the following detailed description thereof. Such description makes reference to the annexed pictorial illustrations, schematics, graphs, and drawings. The figures are not necessarily the scale and certain features and certain views of the figures may be shown exaggerated, to scale or in schematic in the interest of clarity and conciseness. In the drawings.

DETAILED DESCRIPTION OF EXEMPLARY EMBODIMENTS

Figure 1:
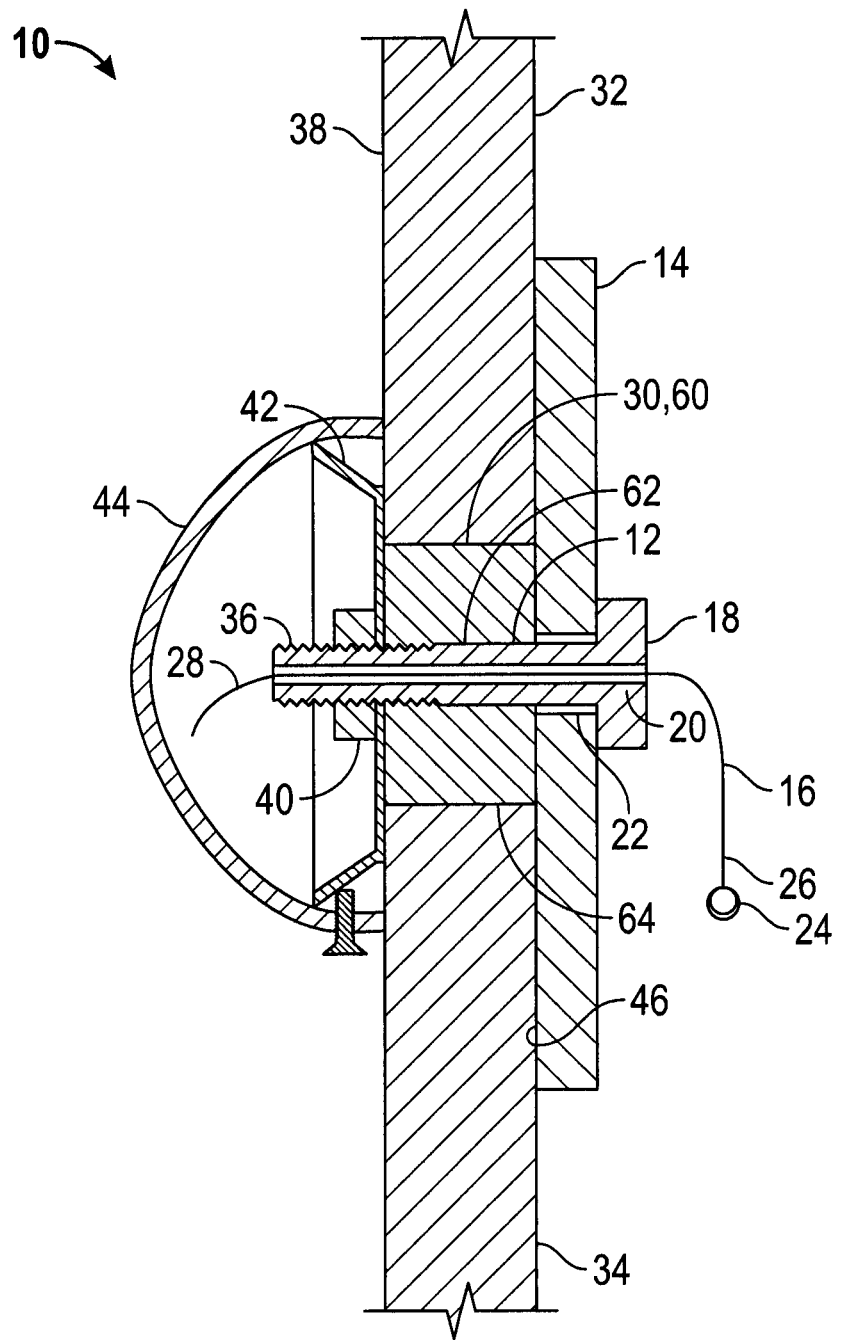
FIG. 1 is a sectional view of an embodiment of a wall mounting assembly mounted on a wall in accordance with the inventive concepts disclosed herein.

Before explaining at least one embodiment of the inventive concept disclosed herein in detail, it is to be understood that the inventive concept is not limited in its application to the details of construction, experiments, exemplary data, and/or the arrangement of the components set forth in the following description, or illustrated in the drawings. The presently disclosed and claimed inventive concept is capable of other embodiments or of being practiced or carried out in various ways. Also, it is to be understood that the phraseology and terminology employed herein is for purpose of description only and should not be regarded as limiting in any way.

In the following detailed description of embodiments of the inventive concept, numerous specific details are set forth in order to provide a more thorough understanding of the inventive concept. However, it will be apparent to one of ordinary skill in the art that the inventive concept within the disclosure may be practiced without these specific details. In other instances, well-known features have not been described in detail to avoid unnecessarily complicating the instant disclosure.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or at least one and the singular also includes the plural unless it is obvious that it is meant otherwise.

The term "wall" in "wall mounting assembly" includes side walls, ceiling walls, hollow wood doors, plaster walls, sheet rock walls, and other hollow walls, friable walls such as gypsum walls, and narrow walls such as corrugated steel and aluminum roofing and siding.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Referring now to the drawings, and more particularly to FIG. 1, shown therein is an exemplary embodiment of a wall mounting assembly 10 constructed in accordance with the inventive concepts disclosed and claimed herein. The wall mounting assembly 10 comprises a threaded bolt 12, an anchor bar 14, and a cord 16. The threaded bolt 12 has a bolt head 18 and a bore 20 extending longitudinally through the entire length of the threaded bolt 12. The anchor bar 14 includes a bolt hole 22 sized to allow slideable insertion of the threaded bolt 12. The cord 16 has a cap 24 at a first end 26, the cap 24 sized larger than the bolt bore 20 so that it acts as a catch, and a second end 28. The first end 26, extending through the bolt bore 20 and the anchor bar bolt hole 22 in a "threaded arrangement," can be introduced through a hole 30 in a wall 32, along with the threaded bolt 12 and the anchor bar 14 and, by retrieving the cord 16 using the second end 28 of the cord 16, the threaded bolt 12 can be caused to insert through the anchor bar bolt hole 22 and draw the anchor bar 14 flush against an interior surface 34 of the wall 32, leaving an exterior end 36 of the threaded bolt 12 protruding from an exterior surface 38 of wall 32. Such position is referred to herein as a "mounting position." In the mounting position, a nut 40 or the like mated to the threaded bolt 12 can secure a fixture back plate 42 against the wall exterior surface 38 while maintaining the anchor bar 14 snuggly against the wall interior surface 34. The fixture back plate 42 can then be used to secure a fixture 44 such as a towel rack, etc.

Figure 2:
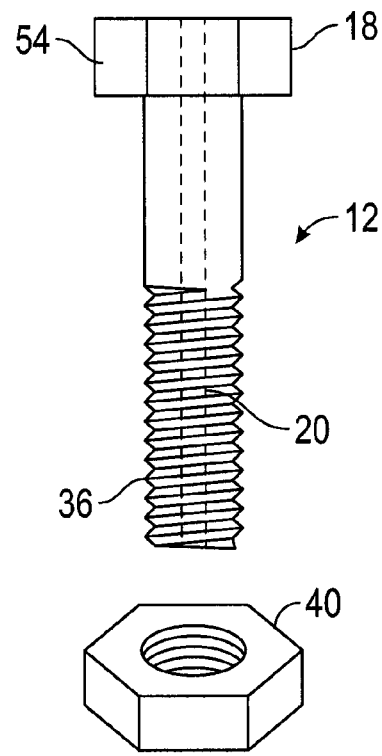
FIG. 2 is a schematic representation of a bored threaded bolt used in an embodiment of the inventive concepts disclosed herein.

As shown in FIG. 2, the threaded bolt 12 can be a common hex bolt; however, any shape bolt head 18 could be used. Bolt 12 can be threaded throughout the length or only toward the bolt exterior end 36. Any material having suitable strength and corrosion properties can be used. Nonlimiting examples of suitable bolt materials include steel, galvanized steel, stainless steel, brass and aluminum. The bolt bore 20 can be drilled into a bolt or the bolt 12 can be cast to provide a hole or bolt bore 20 throughout the length of the bolt 12, including through the bolt head 18. Similarly, the bolt 12 can be cast with threads or the threads can be provided by machining. An experimental wall mounting assembly 10 used a zinc plated hex bolt 1½ inches long, having a ⅜ inch outer diameter and 9/16 inch hexagonal head. The hex bolt was drilled to provide a ⅛ inch diameter bolt bore 20.

The anchor bar 14 provides strength to the wall mounting assembly 10. The spread length of a common toggle anchor is less than 1 or 2 inches and, for hollow wall applications, the spread length is limited by the distance of the space between the walls. Unlike existing toggle anchors, however, the length 50 of anchor bar 14 can be 3 to 10 inches or more. Since the pull-out strength of a hollow-wall anchor is roughly proportional to the spread length of the anchor, it should be readily apparent that the inventive concept(s) disclosed herein provides significant increases in pull-out strength. Unlike some presently marketed hinged anchors, the absence of a hinge further increases the pull-out strength while lessening the chance of failure. The anchor bar 14 can be made of any material providing sufficient bend strength such as aluminum, steel, certain plastics and composites. Less expensive soft and/or brittle materials can often be molded in shapes providing improved bend strength. An experimental wall mounting assembly 10 used a plain steel bar 8 inches long by ¾ inch wide and 3/16 inch thick. For a typical 3½ inch wall cavity, this is about the maximum length bar of this width and thickness that will fit through a 1⅜ inch diameter hole 30 in the wall 32.

Figure 3:
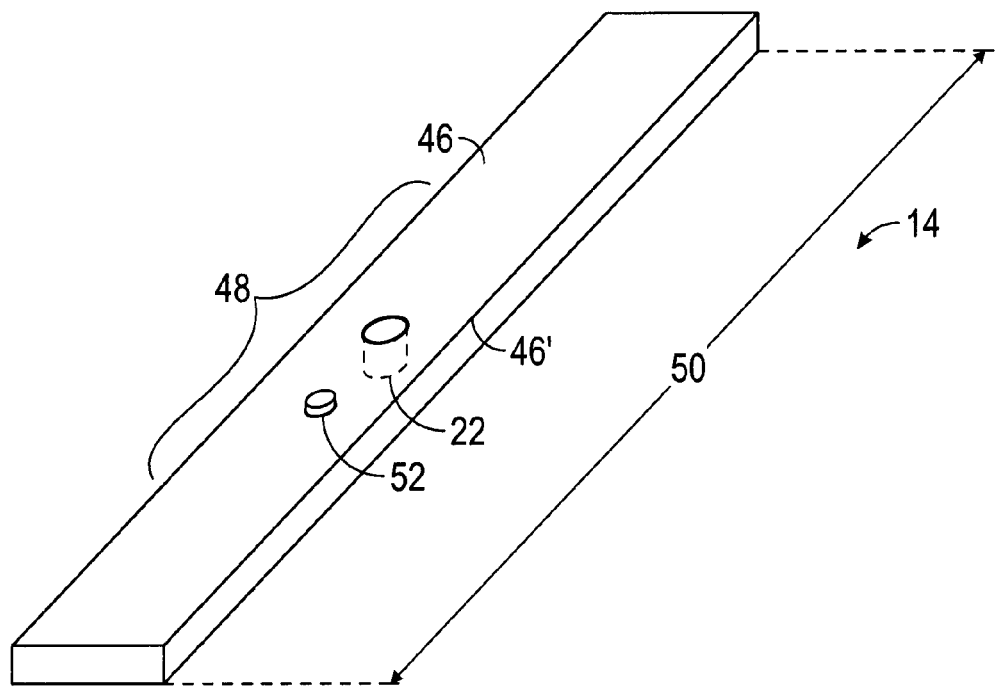
FIG. 3 is a perspective view of an anchor bar used in an embodiment of the inventive concepts disclosed herein.

Referring now to FIG. 3, the anchor bar bolt hole 22 can be located anywhere along an elongated flat surface 46 of the anchor bar 14 and directed perpendicular to the flat surface 46. In one embodiment, the anchor bar bolt hole 22 is drilled in a middle portion 48 representing about 50% of the length 50 of anchor bar 14. While it is sometimes desirable to position the anchor bar bolt hole 22 in the exact center of anchor bar 14, locating the anchor bar bolt hole 22 somewhat off-center can cause the anchor bar 14 to assume a vertical position during installation and this can sometimes be desirable. The experimental wall mounting assembly 10 described above included an 8 inch bar with the anchor bar bolt hole 22 positioned off-center at 4½ inches from one end of the anchor bar 14 (3½ inches from the other end).

The cord 16 is bendable with a length necessary to introduce and lower the threaded bolt 12 and the anchor bar 14 in a threaded arrangement through the hole 30 in the wall 32 and into an interior portion of the wall, while maintaining the second end 28 of the cord 16 on the exterior side of the wall with sufficient length to permit a user to grip and retrieve the threaded bolt 12 and the anchor bar 14 to the mounting position. The minimum diameter of the cord 16 depends on the material and form used, and should be sufficient to provide the strength necessary to retrieve and hold threaded bolt 12 and anchor bar 14 in the mounting position without breaking. Nonlimiting examples of suitable cord material include metal wire, metal braid, and polymer. In one experimental wall mounting assembly 10', 20 lb stainless steel picture hanging wire was used.

The nut 40 fits the threaded bolt 12 and when tightened on the threaded bolt 12, causes the fixture back plate 42 to be secured against the exterior surface 38 of the wall 32 and the anchor bar 14 to be secured flush against the interior surface 34 of the wall 32. Nut 40 can be of any shape and material compatible with and sized to fit threaded bolt 12.

The threaded bolt 12 can typically be tightened with nut 40 without the use of a stop 52. However, the anchor bar 14 can include a stop 52 positioned adjacent the anchor bar bolt hole 22 so as to contact an edge 54 of the bolt head 18 and stop the threaded bolt 12 from rotating when in the mounting position while the threaded bolt 12 is being threaded on. The stop 52 can be a bead or other shape and means known to those skilled in the art.

Figure 4:
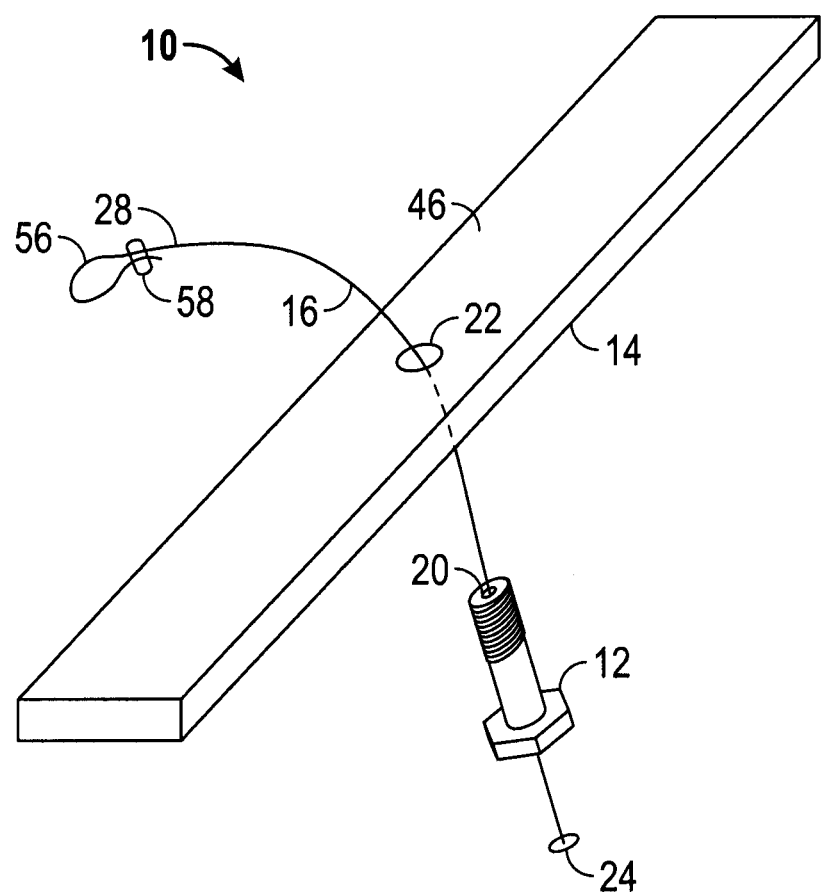
FIG. 4 is a perspective view of an embodiment of a wall mounting assembly constructed in accordance with the inventive concepts disclosed herein.

In one embodiment, shown in FIG. 4, the cord 16 includes a grip 56 positioned at the second end 28 of the cord 16 to help the user grip and retrieve the threaded bolt 12 and anchor bar 14 to the mounting position. Grip 56 is shown in FIG. 4 to comprise a loop of cord 16 fastened to itself by fastener 58; however, grip 56 could be provided by any means as understood by those skilled in the art.

Referring again to FIG. 1, a bushing 60 is provided to plug the hole 30 in the wall 32. The bushing 60 has a bushing aperture 62, typically at the center of bushing 60, sized to allow slideable insertion of the threaded bolt 12. The bushing 60 provides additional support between the fixture back plate 42 positioned against the wall exterior surface 38 and the anchor bar 14 positioned snuggly against the wall interior surface 34. The bushing 60 may be the same thickness as, or slightly thinner than, the wall 32 in which it is inserted, and is intended to fit and plug hole 30 in the wall 32. Using a bushing 60 that is slightly thinner (for example ⅛ inch thinner) than the wall 32 allows for moderate compression of the wall 32 when installation is complete. Both the bushing 60 and the hole 30 may be round, but are not limited to any particular size or shape. The bushing 60 can have a beveled edge 64 to aid in manual insertion of the bushing 60 into the hole 30 in the wall 32. Examples of suitable materials from which bushing 60 can be manufactured include, but are not limited by, wood, plywood, polymer, hard rubber, plastic, neoprene, metal, metal honeycomb, composites, and the like. In an experimental wall mounting assembly 10', a 1⅜ inch diameter wood bushing 60' was used having a 7/16 inch thickness and 7/16 inch diameter aperture 62'. The bushing 60 was champhered slightly on one face to produce beveled edge 64'.

A method of hanging a fixture, such as a towel bar comprises, providing the wall mounting assembly 10 as described above. Hole 30 is drilled or cut into the wall 32, optionally using a hole saw. The hole 30 is sized to accept the anchor bar 14. The cord 16 is threaded through the bolt bore 20 and the anchor bar bolt hole 22 such that the cord cap 24 is proximate bolt head 18. The first end 26 of the cord 16, the threaded bolt 12, and the anchor bar 14 are passed through the hole 30 in the wall 32. The cord 16 is then retrieved causing the threaded bolt 12 to insert through the anchor bar bolt hole 22 and draw the anchor bar flush against an interior surface 34 of the wall 32. If the bushing 60 is used, the second end 28 of the cord 16 is passed through the bushing aperture 62 such that the beveled edge 64 of the bushing 60 is facing the wall 32 and, while maintaining tension on the cord 16, bushing 60 is inserted into the hole 30 such that the threaded bolt exterior end 36 protrudes through the bushing aperture 62.

A fixture back plate 42 is positioned over the hole 30 and bushing 60, allowing the threaded bolt exterior end 36 to protrude along with cord second end 28. The fixture backplate 42 can be the same as, or similar to, those presently supplied with standard towel bars. The second end 28 of the cord 16 is passed through nut 40 and nut 40 is tightened onto the threaded bolt 12. In this manner, the fixture back plate 42 is secured against the exterior surface 38 of the wall 32, and the anchor bar 14 is secured flush against the interior surface 34 of the wall 32 as in FIG. 1. Once the fixture back plate 42 is secured, the fixture can be secured to the back plate using methods known to those in the art. The bulk of cord 16 can be fed into the interior of the wall 32 using the fixture to hide the cord grip 56. This allows the fastener to be retrieved and reused at a later date. Alternatively, the cord 16 can be cut and removed, allowing the first end 26 of the cord 16 and cord cap 24 to fall behind the wall 32, or the entire cord 16 can be allowed to fall behind the wall 32.

Figure 5:
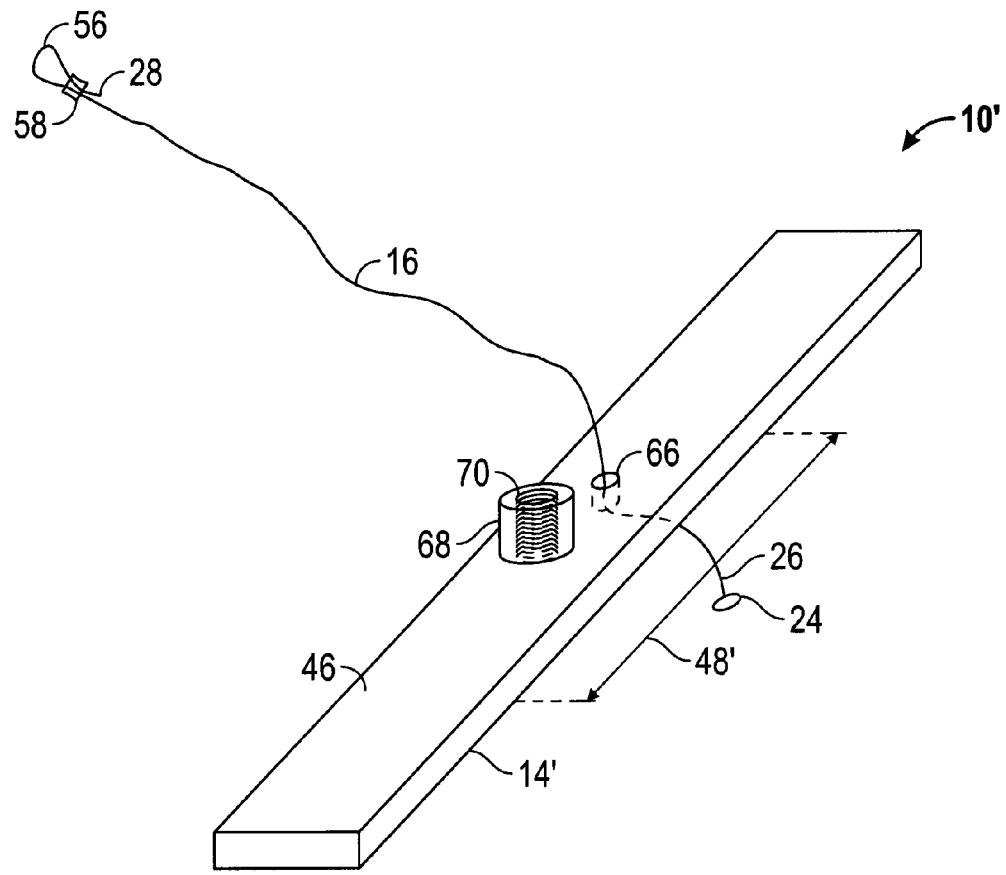
FIG. 5 is a perspective view of another embodiment of a wall mounting assembly constructed in accordance with the inventive concepts disclosed herein.
Figure 6:
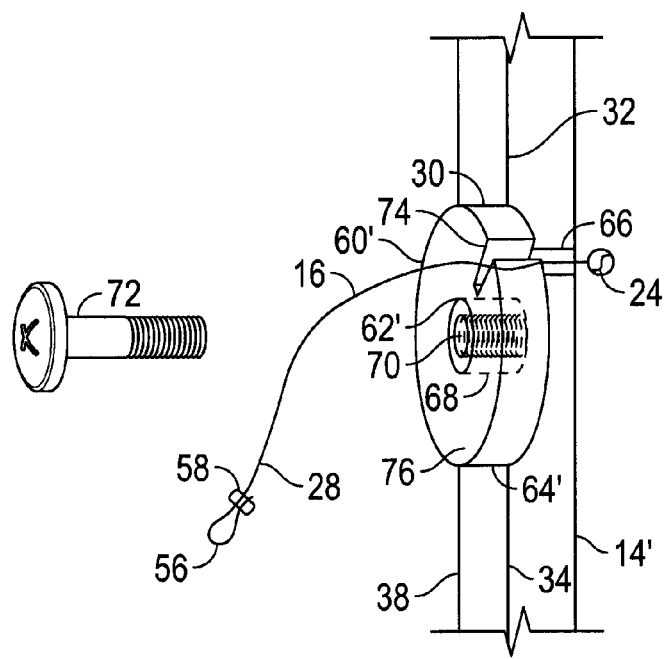
FIG. 6 is a perspective view of another embodiment of a wall mounting assembly mounted on a wall in accordance with the inventive concepts disclosed herein.

In another embodiment, the fixture itself provides a structural "back plate" and must be secured to the wall 32 using a fixture screw 72. Rather than screwing the fixture into the wall 32 using a common plastic wall fastener, a wall mounting assembly 10' is provided as in FIG. 5. The cord 16 is threaded through a perforation 66 in the anchor bar 14' (also referred to as the "anchor bar perforation" 66) proximate a fixed bolt 68. Fixed bolt 68 is positioned similar to anchor bar bolt hole 22, i.e., in a middle portion 48' representing about 50% of the length 50 of anchor bar 14'. Fixed bolt 68 has an internally threaded or tapped first end 70 for engaging the fixture screw 72. The length of fixed bolt 68 is such that the tapped first end 70 is flush with the wall exterior surface 38 when the anchor bar 14' is held flush against the wall interior surface 34 in the mounting position as shown in FIG. 6. A bushing 60' is optionally provided, the bushing 60' being sized and shaped generally as described above, with an aperture 62' sized to accept the fixed bolt 68, and a bushing slot 74 for accepting the cord 16.

In one embodiment, a method for mounting a wall, door or ceiling fixture comprises providing the wall mounting assembly 10' as described above. Hole 30 is drilled or cut into the wall 32, optionally using a template, the hole 30 sized to accept anchor bar 14' with fixed bolt 68. The cord 16 is threaded through the anchor bar perforation 66 such that the cord cap 24 is on the opposite side of the anchor bar from the fixed bolt 68. The anchor bar 14' and the cord first end 26 are passed through the hole 30 in the wall 32. The cord 16 is then retrieved causing the anchor bar 14' to be drawn flush against an interior surface 34 of the wall 32. If the bushing 60' is used, the cord 16 is passed through the bushing slot 74 and the bushing 60' is positioned such that the beveled edge 64' is facing the wall 32. While maintaining tension on the cord 16, bushing 60' is inserted into the hole 30 such that the fixed bolt 68 extends through the aperture 62', remaining flush with an exterior surface 76 of the bushing 60', and flush with the wall exterior surface 38. The fixture can now be mounted to the wall using fixture screw 72 engaged in internally threaded (tapped) first end 70.

It should be noted that the inventive concept(s) disclosed herein can additionally remedy an undesired tear in the wall caused by a standard hollow wall fastener pulling free and breaking or tearing a portion of the wall. Normally, the exposed tear must be covered and the fixture relocated. However, it is often not desirable and sometimes not possible to relocate the fixture. In this case, the hole 30 can be positioned over and encompass the tear in the wall 32. This allows for identical placement of the fixture, and the tear in the wall no longer requires repair.

From the above description, it is clear that the inventive concept(s) disclosed herein is well adapted to carry out the objects and to attain the advantages mentioned herein as well as those inherent in the inventive concept disclosed herein. While exemplary embodiments of the inventive concept disclosed herein have been described for purposes of this disclosure, it will be understood that numerous changes may be made which will readily suggest themselves to those skilled in the art and which are accomplished without departing from the scope of the inventive concept disclosed herein and defined by the appended claims.

What is claimed is:

1. A wall mounting assembly, comprising:
   a threaded bolt having a head and a bore extending longitudinally through the threaded bolt;
   an anchor bar having a bolt hole sized to allow slideable insertion of the threaded bolt;
   a cord having a cap at a first end, the cap sized larger than the threaded bolt bore, and a second end insertable through the threaded bolt bore such that the first end, the threaded bolt, and the elongated anchor can be introduced through a hole in the wall and, by retrieving the cord, the threaded bolt can be caused to insert through the anchor bar bolt hole and draw the anchor bar flat against an interior surface of the wall;
   a nut fitting the threaded bolt such that, when tightened on the threaded bolt, a fixture back plate positioned between an exterior surface of the wall and the nut, can be secured against the exterior surface of the wall and the anchor bar can be secured flat against the interior surface of the wall; and
   a bushing configured to plug the hole in the wall, the bushing having an aperture sized to allow slideable insertion of the threaded bolt.

2. The wall mounting assembly of claim 1, wherein the bushing has a thickness such that when the nut is tightened on the threaded bolt with the fixture back plate and the wall positioned between the nut and the anchor plate, the wall can be compressed between the anchor plate and the fixture back plate.

3. A method for mounting a fixture on a wall, the method comprising:
   cutting a hole in a wall;

providing a wall mounting assembly comprising (1) a threaded bolt having a head and a bore extending longitudinally through the threaded bolt, (2) an anchor bar having a bolt hole sized to allow slideable insertion of the threaded bolt, (3) a cord connecting the threaded bolt and the anchor bar, the cord having a cap at a first end, the cap adjacent to and sized larger than the threaded bolt bore and (4) a bushing configured to plug the hole in the wall, the bushing having an aperture sized to allow slideable insertion of the threaded bolt;

introducing through the hole in the wall, the threaded bolt, the anchor bar and a portion of the cord connecting the threaded bolt and the anchor bar;

retrieving the cord to cause the threaded bolt to insert through the anchor bar bolt hole and draw the anchor bar flat against an interior surface of the wall;

inserting the cord and an exterior end of the threaded bolt through the bushing aperture and positioning the bushing in the hole in the wall; and fitting a nut to the exterior end of the threaded bolt such that, when tightened onto the threaded bolt, a face plate positioned between an exterior surface of the wall and the exterior end of the bolt, is secured against the exterior surface of the wall and the anchor bar is secured flat against the interior surface of the wall.

4. A wall mounting assembly, comprising:

an anchor bar having an elongated flat surface, a bolt fixedly positioned to a mid-section of the flat surface, and a perforation through the flat surface proximate the fixed bolt, the bolt extending perpendicular to the anchor bar flat surface for a distance equal to the thickness of the wall, the extended portion of the bolt terminating with an internally threaded end;

a cord having a cap at a first end, the cap sized larger than the perforation, and a second end insertable through the perforation such the anchor bar with the cord inserted therethrough can be introduced through a hole in the wall and can then be drawn flat against an interior surface of the wall by retrieving the cord; and a bushing configured to plug the hole in the wall, the bushing having an aperture sized to allow slideable insertion of the internally threaded bolt end, and further having a slot extending to a periphery of the bushing so as to receive the cord.

5. A method for mounting a fixture on a wall, the method comprising:

providing the wall mounting assembly of claim 4;

introducing through a hole in the wall, the anchor bar with the cord threaded through the perforation such that the cap is on a flat surface opposing the bolt;

retrieving the cord to cause the anchor bar to be drawn flat against an interior surface of the wall with the internally threaded bolt end extending into the hole in the wall;

fitting the bushing into the hole in the wall, such that the internally threaded bolt end is inserted into the bushing aperture and the cord extends through the slot; and engaging a fixture screw through a fixture into the internally threaded bolt end such that, when tightened onto the internally threaded bolt, the fixture positioned is secured against the exterior surface of the wall and the anchor bar is secured flat against the interior surface of the wall.

* * * * *